US007165411B2

(12) United States Patent
Eisenhour

(10) Patent No.: US 7,165,411 B2
(45) Date of Patent: Jan. 23, 2007

(54) CONTROL LOGIC FOR HVAC HEAT MANAGEMENT

(75) Inventor: Ronald Eisenhour, West Bloomfield, MI (US)

(73) Assignee: Nissan Technical Center North America, Inc. MI (US)

( * ) Notice: Subject to any disclaimer, the term of this patent is extended or adjusted under 35 U.S.C. 154(b) by 316 days.

(21) Appl. No.: 10/933,457

(22) Filed: Sep. 3, 2004

(65) Prior Publication Data

US 2006/0048531 A1    Mar. 9, 2006

(51) Int. Cl.
*F25B 1/00*    (2006.01)
*F25B 49/00*    (2006.01)
*B60H 1/32*    (2006.01)

(52) U.S. Cl. ............... 62/228.3; 62/228.5; 62/229; 62/244

(58) Field of Classification Search .............. 62/133, 62/228.1, 228.3, 228.5, 229, 244
See application file for complete search history.

(56) References Cited

U.S. PATENT DOCUMENTS

| | | | |
|---|---|---|---|
| 4,919,195 A | 4/1990 | Tanino | |
| 5,167,127 A * | 12/1992 | Ohtsu | 62/133 |
| 5,701,753 A * | 12/1997 | Iritani | 62/211 |
| 5,832,990 A | 11/1998 | Eisenhour | |
| 5,995,889 A | 11/1999 | Eisenhour | |
| 6,272,871 B1 | 8/2001 | Eisenhour | |
| 6,655,165 B1 | 12/2003 | Eisenhour | |

\* cited by examiner

*Primary Examiner*—Marc Norman
(74) *Attorney, Agent, or Firm*—Global IP Counselors

(57) ABSTRACT

An air conditioner has a controller that controls the operation of a refrigerant circuit that has a compressor, a condenser, an expansion valve or orifice tube, and an evaporator. The condenser receives a compressed refrigerant from the compressor and condenses the refrigerant to either a liquid phase or a saturated liquid-vapor phase. The condensed refrigerant is then passed through the expansion valve or orifice tube to expand the refrigerant and to delivery the refrigerant to the evaporator. The controller is operatively coupled to the compressor to operate the compressor to change an average condenser temperature of the condenser from a first temperature to a second temperature that is lower than the first temperature based on at least one control signal indicative of thermal requirements of a vehicle component influenced by the average condenser temperature of the condenser.

28 Claims, 11 Drawing Sheets

Outside Air Temperature
Threshold Component ONT1
(Compressor ON)

Engine Coolant Temperature
Threshold Component ONT2
(Compressor ON)

Condenser Refrigerant Pressure
Threshold Component ONP1
(Compressor ON)

Outside Air Temperature
Threshold Component OFT1
(Compressor OFF)

Engine Coolant Temperature
Threshold Component OFT2
(Compressor OFF)

Condenser Refrigerant Pressure
Threshold Component OFP1
(Compressor OFF)

CONTROL LOGIC FOR HVAC HEAT MANAGEMENT

BACKGROUND OF THE INVENTION

1. Field of the Invention

The present invention generally relates to controlling an air conditioner to manage the thermal effect of the condenser preheating air that is used to cool the engine or other components of the vehicle. In other words, the present invention relates to control of an air conditioner such that the performance of the air conditioner is reduced in response to increases in the thermal condition of the engine or other components of the vehicle affected by the condenser temperature.

2. Background Information

A typical automobile air conditioner includes a compressor, a condenser, an expansion valve or orifice tube, and an evaporator. The compressor compresses a cool vapor-phase refrigerant (e.g., Freon, R134a) to heat the same, resulting in a hot, high-pressure vapor-phase refrigerant. This hot vapor-phase refrigerant runs through a condenser, typically a coil that dissipates heat. The condenser condenses the hot vapor-phase refrigerant into liquid refrigerant. The liquid refrigerant is throttled through an expansion valve, which evaporates the refrigerant to a cold, low-pressure saturated liquid-vapor-phase refrigerant. This cold saturated liquid-vapor-phase refrigerant runs through the evaporator, typically a coil that absorbs heat from the air fed to the passenger compartment.

The condenser of the automobile air conditioner is typically located in front of the radiator of the automobile such that the air conditioner's condenser is essentially preheats the outside air that is used to cool the engine. Normally, this arrangement does not significantly effect the operation of the engine. However, during high ambient temperatures and high load conditions (e.g., hill climbing, towing, etc.), the engine temperature may rise above the suitable temperature ranges for the fluids and/or materials of the engine. In some conventional air conditioning systems, the engine controller will operate the air conditioner using normal control logic without regard to the thermal conditions of the engine and/or other components. However, when the engine control unit in these conventional air conditioning units determine that the thermal conditions of the engine and/or other components are very severe, then the engine controller completely turns off the air conditioner until the thermal conditions have returned to suitable level. Since the engine overheating normally occurs during high ambient temperatures, the vehicle cabin temperature often rises to uncomfortable levels when the air conditioner is shut off to allow the thermal conditions of the engine to return to suitable level.

In view of the above, it will be apparent to those skilled in the art from this disclosure that there exists a need for an improved air conditioner control system. This invention addresses this need in the art as well as other needs, which will become apparent to those skilled in the art from this disclosure.

SUMMARY OF THE INVENTION

The present invention relates to an air conditioner comprising a condenser or heat removal device, an evaporator, a compressor and a controller. As mentioned above, it has been discovered that when the condenser is positioned in front of the radiator, the condenser preheats the air that is used to cool the engine.

Accordingly, the present invention proposes to reduce the performance of the air conditioner in response to increases in the thermal condition of the engine or other components of the vehicle such that the thermal effect of the condenser preheating the air that is used to cool the engine if it is reduced. In other words, new control logic is provided in which a proportional air conditioner response is adjusted to maintain the thermal requirement of a component that is influenced by the temperature of the air passing through the condenser. This proposed control logic maintains the air conditioner operation while managing the thermal requirement of the various components that are influenced by the temperature of the air passing through the condenser. Accordingly, uninterrupted air conditioning is provided at a reduced level such that the thermal requirements of the components can be maintained at suitable level. Although the air conditioning function of the vehicle cabin is slightly degraded, this is preferable over complete loss of air conditioning to the vehicle cabin. In other words, this arrangement keeps the cabin temperature at a suitable level while directing less heat to the evaporator core.

In view of the forgoing, an air conditioner is provided that basically comprises a condenser, an evaporator, a compressor and a controller. The condenser is configured to receive a refrigerant in a compressed state and remove heat from at least a portion of the refrigerant. The evaporator is in fluid communication with the condenser to receive the refrigerant, and is configured to evaporate at least a portion of the refrigerant. The compressor is in fluid communication with the evaporator, and is configured to compress the refrigerant and deliver the refrigerant in the compressed state to the condenser. The controller is operatively coupled to the compressor to operate the compressor to change an average condenser temperature of the condenser from a first temperature to a second temperature that is lower than the first temperature based on at least one control signal indicative of thermal requirements of a vehicle component influenced by the average condenser temperature of the condenser.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
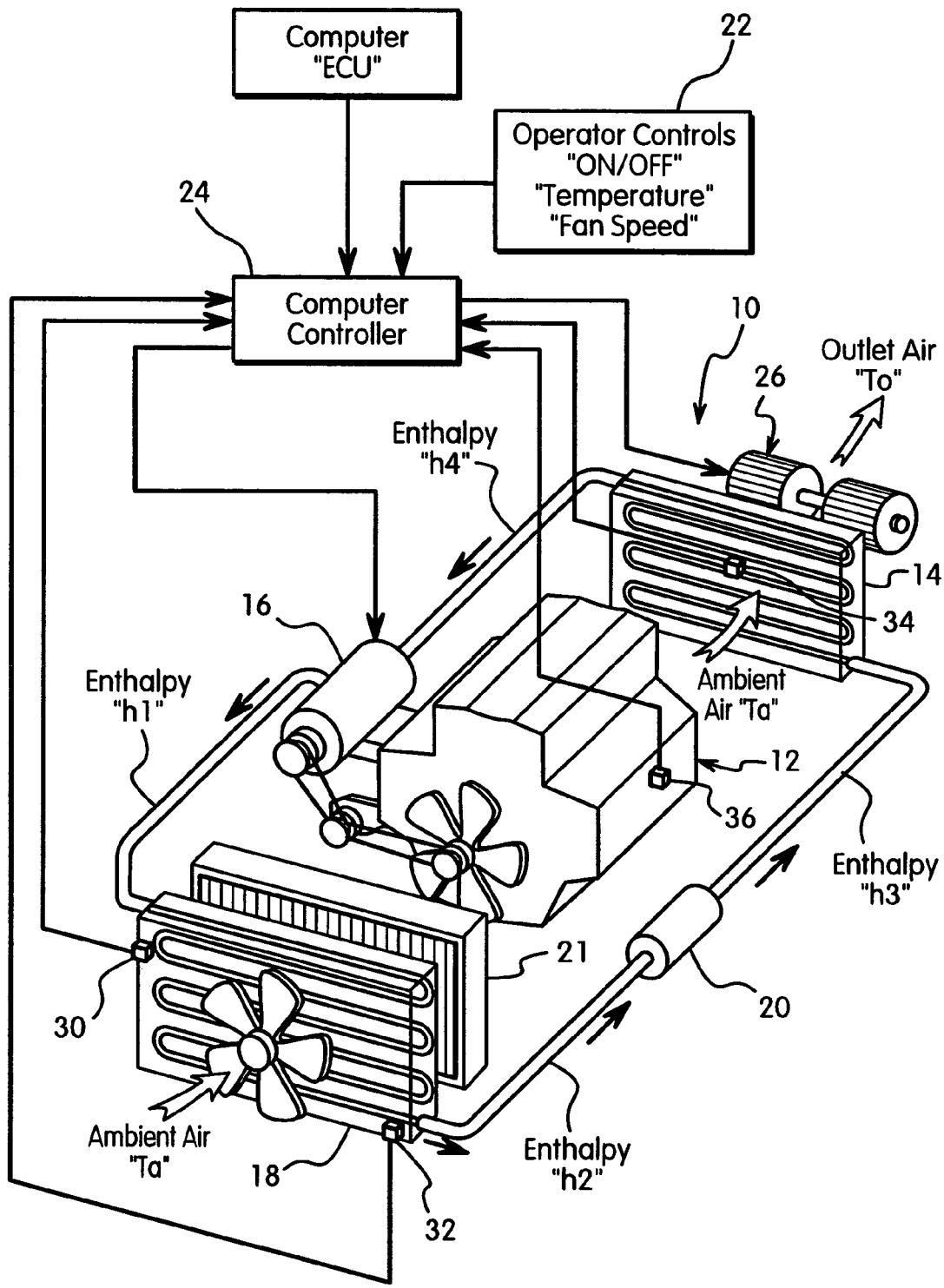
FIG. 1 is a simplified schematic diagram of a portion of vehicle equipped with an air conditioner system having a refrigerant circuit that is controlled in accordance with a first embodiment of the present invention.

Referring initially to FIG. 1, an air conditioner 10 is illustrated in accordance with a first embodiment of the present invention. The air conditioner 10 according to the present invention is particularly suitable for an automobile or other passenger vehicle (such as but not limited to a car, an SUV, a minivan, a station wagon, a pick-up truck, etc.,) as well as refrigeration systems for homes and industrial use. In the illustrated embodiment, the air conditioner 10 is driven by a vehicle engine 12 in a conventional manner.

Basically, the air conditioner 10 has a refrigerant circuit that includes an evaporator 14, a compressor 16, a condenser 18 and an expansion valve or orifice 20. These components 14, 16, 18 and 20 are conventional components that are well known in the air conditioning field. Since these components 14, 16, 18 and 20 are well known in the air conditioning field, the structures of the components 14, 16, 18 and 20 will not be discussed or illustrated in detail herein.

The compressor 16 is fluidly connected to the condenser 18 via a refrigerant pipe or conduit. The condenser 18 is located in front of a radiator 21 that cools the engine coolant of the engine 12. The evaporator 14 is also fluidly connected to the compressor 16 via a refrigerant pipe or conduit. The expansion valve 20 is fluidly connected to the condenser 18 via a refrigerant pipe or conduit, and to the evaporator 14 by a refrigerant pipe or conduit. Thus, a refrigerant (e.g., Freon, R134a) is circulated through the refrigerant circuit of the air conditioner 10 to cool the passenger compartment or vehicle cabin.

In particular, the compressor 16 receives and compresses a cool vapor-phase refrigerant from the evaporator 14. The compressor 16 is preferably turned ON and OFF by selectively energizing and de-energizing the electromagnetic clutch of the compressor 16 to adjust the temperature and pressure of the evaporator 14. Alternatively, the compressor 16 is a variable displacement compressor that is configured to regulate the pressure of the evaporator 14 by changing its displacement. This shifting the target pressure of the evaporator 14 upward causes the saturation temperature of the evaporator 14 to rise with the rise in the pressure. The compression action heats the refrigerant, resulting in a hot, high-pressure vapor-phase refrigerant. This hot vapor-phase refrigerant is then fed through the condenser 18, such as an air-cooled coil that dissipates heat.

The condenser 18 condenses the hot vapor-phase refrigerant into a liquid-phase refrigerant or a saturated liquid-vapor-phase refrigerant. In the preferred embodiment of the present invention, the condenser 18 condenses the refrigerant by air cooling. Thus, the condenser 18 of the preferred embodiment is a heat removal device. The condensed refrigerant is then delivered through the expansion valve 20, which expands the liquid-phase or saturated liquid-vapor-phase refrigerant to a cold, low-pressure liquid-vapor-phase refrigerant having a higher vapor content. The cold liquid-vapor-phase refrigerant (having a higher vapor content than the refrigerant exiting the condenser) runs through the evaporator 14, typically a coil that absorbs heat from and cools the air delivered to the passenger compartment or vehicle cabin.

The operations of the air conditioner 10 are controlled by a set of operator controls 22 that are located in the cabin of the vehicle. The operator controls 22 typically will include an ON/OFF switch, a temperature control and a blower of fan speed control. Once the operator turns on the air conditioner 10, a control signal is received by a computer controller 24 of the computer or engine control unit ECU. In other words, the computer controller 24 operates the air conditioner 10 in accordance with the settings of the operator controls 22.

The computer controller 24 basically controls the operation of the air conditioner 10 by operating the compressor 16 between an ON operating state and an OFF operating state or changing the displacement of the compressor 16. For example, the computer controller 24 selectively activates and deactivates a compressor clutch of the compressor 16 to switch between the ON operating state and the OFF operating state. More specifically, the computer controller 24 selectively turns ON and OFF the compressor 16 or changing the displacement of the compressor 16 based on various control signals so as to substantially maintain the passenger compartment or vehicle cabin at a prescribed temperature setting that was set by the operator controls 22. Moreover, the computer controller 24 selectively controls a fan or blower 26 at a prescribed fan speed in accordance with a fan speed setting that was set by the operator controls 22.

In the illustrated embodiment, the normal control logic of the air conditioner 10 is based on control signals from one or more of the following sensors: an outside air temperature sensor 30, a refrigerant pressure transducer or sensor 32, an evaporator temperature sensor 34, and an engine part/fluid temperature sensor 36. The outside air temperature sensor 30 is configured and arranged to detect the outside air temperature Ta, and output a signal to the computer controller 24 that is indicative of the outside air temperature Ta. Preferably, the outside air temperature sensor 30 is disposed in front of the condenser 18. The refrigerant pressure transducer or sensor 32 is configured and arranged to detect the refrigerant pressure P inside the condenser 18, and output a signal to the computer controller 24 that is indicative of the refrigerant pressure P. The evaporator temperature sensor 34 is configured and arranged to detect the evaporator temperature Te, and output a signal to the computer controller 24 that is indicative of the evaporator temperature Te. The engine part/fluid temperature sensor 36 is configured and arranged to detect the temperature of an engine part/fluid such as the engine coolant Tw, and output a signal to the computer controller 24 that is indicative of the temperature of the engine part/fluid, e.g., the engine coolant Tw.

The computer controller 24 preferably includes a microprocessor and an air conditioner control program that controls the compressor 16 as discussed below. The computer controller 24 can also include other conventional components such as an input interface circuit, an output interface circuit, and storage devices such as a ROM (Read Only Memory) device and a RAM (Random Access Memory) device. The microprocessor of the computer controller 24 is programmed to control the air conditioner 10. The memory circuit stores processing results and control programs for controlling the operation of the compressor 16. The computer controller 24 is operatively coupled to the engine control unit ECU in a conventional manner. The internal RAM of the computer controller 24 stores statuses of operational flags and various control data. The internal ROM of the computer controller 24 stores the control logic for various operations of air conditioner 10. It will be apparent to those skilled in the art from this disclosure that the precise structure and algorithms for the computer controller 24 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Basically, the air conditioner 10 of the present invention is controlled by the computer controller 24 to protect the engine 12 or other components, which are influenced by the temperature of the air passing through the condenser 18, from reaching undesirable temperatures. More specifically, the computer controller 24 is operatively coupled to the compressor 16 to operate the compressor 16 to change (reduce) the average condenser temperature of the condenser 18 from a first temperature to a second temperature that is lower than the first temperature based on at least one control signal indicative of thermal requirements of a component (e.g., engine 12) influenced by the average condenser temperature of the condenser 18. In one preferred embodiment, the compressor 16 is preferably turned ON and OFF by selectively energizing and de-energizing the electromagnetic clutch of the compressor 16 to adjust the temperature and pressure of the evaporator 14. Alternatively, the displacement of the compressor 16 is changed to adjust the temperature and pressure of the evaporator 14. In other words, in another preferred embodiment, the compressor 16 is configured to regulate the pressure of the evaporator 14 by changing its displacement from a first pressure to a second pressure. This upward shift of the target pressure of the evaporator 14 by the compressor 16 changing its displacement causes the saturation temperature of the evaporator 14 to rise with the rise in the pressure.

Now one preferred control logic will be discussed for regulating the temperature and pressure of the evaporator 14 in which the compressor 16 is cycled between ON and OFF operating states. Of course, it will be apparent to those skilled in the air conditioner field from this disclosure that the compressor displacement can be controlled to manage the evaporator pressure, and thus the evaporator's saturation temperature, to accomplish results similar to controlling compressor cycling thresholds. In the illustrated flow charts, the value of the average evaporator temperature Te can be replaced with a control pressure to carry out this alterative control logic. In each case, the average evaporator temperature Te moves closer to the ambient temperature Ta. Thus, the average condenser temperature Tc can be lowered.

Moreover, while the present invention will be described and illustrated relative to protecting the engine 12 from over heating by cycling the compressor 16, it will be apparent to those skilled in the art from this disclosure that the present invention can be utilized to protect other vehicle components and/or fluids influenced by the rise in condenser temperature. In the illustrated embodiment, the computer controller 24 receives a control signal from the engine part/fluid temperature sensor 36 that detects the temperature of a vehicle part or vehicle fluid (e.g., coolant, transmission oil, engine oil, etc.). In the illustrated embodiment, the engine part/fluid temperature sensor 36 detects the temperature of the engine coolant Tw, and sends a control signal to the computer controller 24 which is indicative of thermal requirements of the engine 12 or some other engine part or fluid. The engine temperature and other engine part/fluids are directly influenced by the average condenser temperature of the condenser 18, since the air passing through the condenser 18 is essentially preheated before passing through the radiator. For example, when the temperature of the engine coolant Tw, or other engine part/fluid, reaches a prescribed temperature value, the computer controller 24 operates the compressor 16 in a such manner (described below with reference to FIG. 12) to lower the average condenser temperature of the condenser 18 from a first temperature to a second lower temperature. Thus, based on the control signal from the engine part/fluid temperature sensor 36, the average condenser temperature of the condenser 18 is lower to protect the engine 12. Of course, it will be apparent to those skilled in the air conditioner field from this disclosure that the present invention can be utilized to protect other vehicle components and/or influenced by the rise in condenser temperature.

Accordingly, the control logic of the present invention is based on the premise that changing the evaporator temperature Te of the evaporator 14 changes the condenser temperature Tc of the condenser 18. Thus, the control logic of the computer controller 24 reduces the temperature of the condenser 18 by managing the evaporator temperature Te according to thermal requirements of the engine 12 or other components that reside downstream of the condenser 18. Thus, by reducing the condenser temperature of the condenser 18, the temperature of the air flowing into the radiator 21 is lowered. The average temperature difference between the ambient air temperature Ta and the evaporator surface temperature Te can be found with the following equation:

$$\Delta T = -(Ta-To)/LN[(To-Te)/(Ta-Te)]$$

wherein: Ta represents the air ambient air into the evaporator;
To represents the outlet air temperature from the evaporator;
Te represents the evaporator surface temperature.

Figure 2:
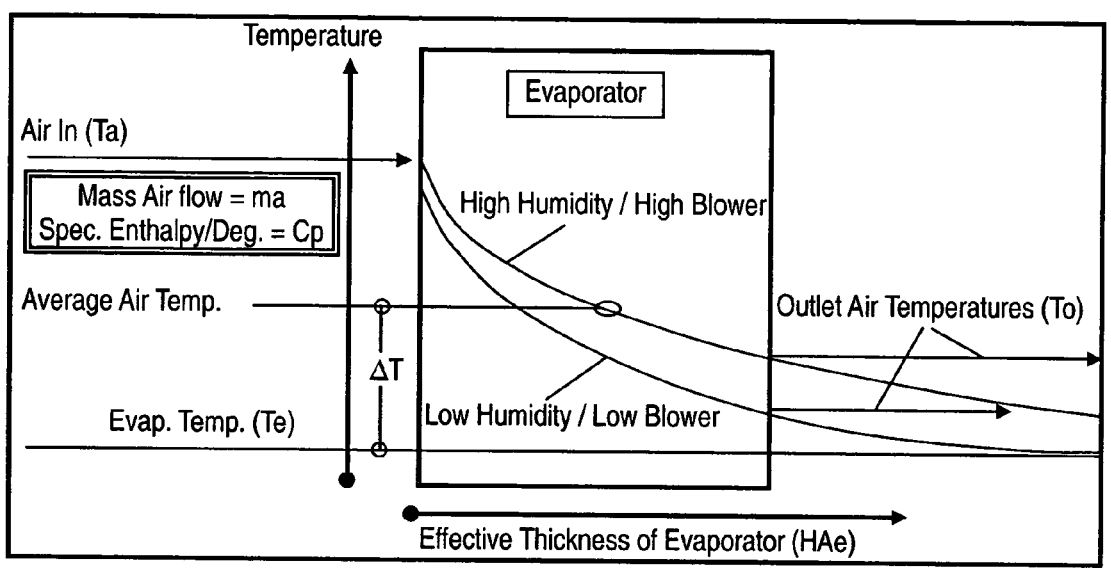
FIG. 2 is a simplified schematic diagram showing the change in air temperature as the air flows through the evaporator.

The performance of the condenser 18 relative to the evaporator 14 can be extracted from the energy balance relationships from the refrigeration cycle, shown in FIG. 1, referring to the diagram of FIG. 2 and utilizing the following equations:

$$mr \cdot (h1-h2) = HAc \cdot (Tc-Ta)$$

$$mr \cdot (h4-h3) = HAe \cdot (\Delta T)$$

$$HAc/HAe = (h1-h2) \cdot (\Delta T)/[(h4-h3) \cdot (Tc-Ta)]$$

$$Tc = Ta + (HAe/HAc) \cdot (h1-h2) \cdot (\Delta T)/[(h4-h3)]$$

In these equations, the term mr represents the refrigerant mass flow rate, the term HAc is the effective thickness of condenser, the term HAe represents the effective thickness of evaporator, the term Tc represents the average condenser temperature, the terms h1, h2, h3 and h4 represent the enthalpies at the points shown in the refrigeration cycle of FIG. 1, and the term $\Delta T$ represents the change in temperature between the ambient air temperature Ta and the evaporator temperature Te.

For simplicity sake, if one assumes that HAe/HAc is a constant and the specific enthalpy differences are essentially unchanged, the condenser temperature Tc is strongly dependent on the average temperature difference $\Delta T$. Accordingly, as the outlet air temperature To exiting the evaporator 14 rises and the evaporator temperature Te approaches the ambient air temperature Ta, then the condenser temperature Tc approaches the ambient temperature Ta, which reduces the preheating effect of the ambient air entering the radiator 21. Accordingly, in accordance with the present invention, it is desirable to raise the evaporator temperature Te of the evaporator 14 so that the evaporator temperature Te approaches the ambient air temperature Ta. This control of the air conditioner 10 is accomplished by utilizing the control logic illustrated by the flow chart of FIG. 12, as discussed below.

Figure 3:
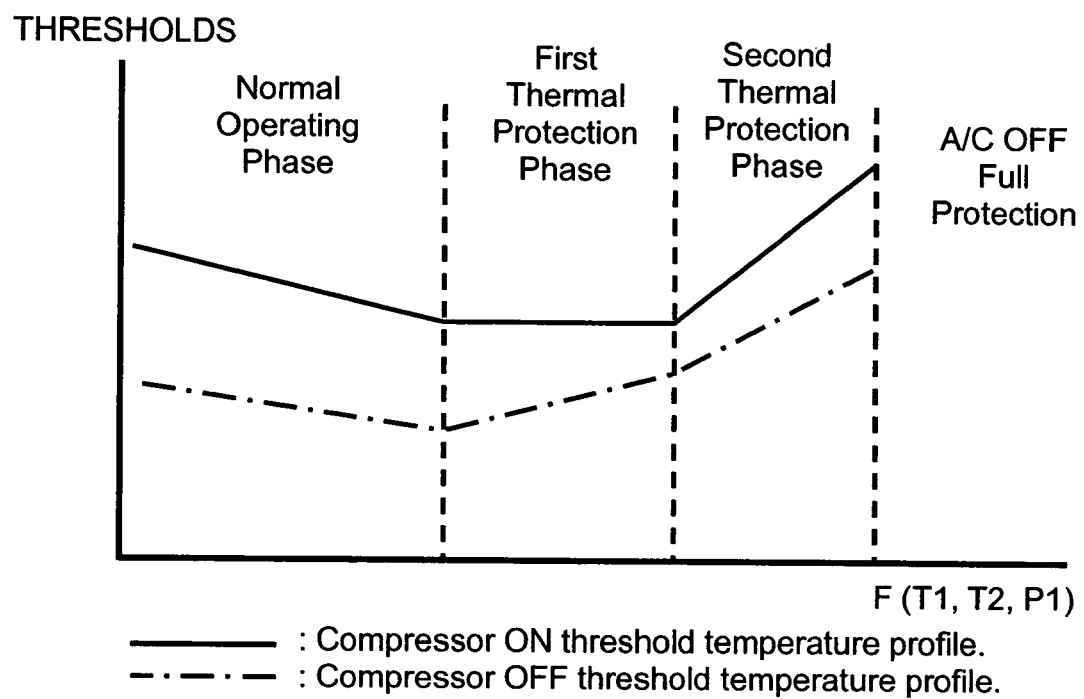
FIG. 3 is a chart showing the compressor ON and OFF threshold temperature profiles for an air conditioner that is controlled in accordance with the present invention.

Now referring to FIG. 3, the compressor ON threshold temperature profile and the compressor OFF threshold temperature profile will now be discussed. However, it will be apparent to those skilled in the air conditioner field that the following logic can be applied to adjusting the displacement of the compressor UP and DOWN to raise the evaporator temperature Te of the evaporator 14 so that the evaporator temperature Te approaches the ambient air temperature Ta Basically, in the present invention, in the illustrated the compressor ON threshold temperature for turning ON the compressor 16 and the compressor OFF threshold temperature for turning OFF the compressor varies between a normal operating phase, a first thermal protection phase, and a second thermal protection phase. Of course, if the engine 12 significantly overheats, the air conditioner 10 will be shut down such that the cabin temperature will rise to the ambient temperature of the outside air or higher.

During normal air conditioning phase, the compressor ON threshold temperature and the compressor OFF threshold temperature are determined as a function of solely the outside air temperature Ta. In other words, during the normal air conditioning phase, the compressor 16 is cycled ON and OFF independently of the temperature of the engine 12. Thus, the normal operating phase is unaffected by the engine coolant temperature Tw and the condenser refrigerant pressure. Preferably, during normal air conditioning operation, the cooling range for operating the compressor 16 remains substantially constant. However, preferably, the compressor ON and OFF threshold temperatures decrease as the outside air temperature increases as seen in FIG. 3.

During the first thermal protection phase, the compressor ON and OFF threshold temperatures are adjusted as a function of the outside air temperature, the engine coolant temperature and the compressor refrigerant pressure. More specifically, the compressor ON threshold temperature is preferably set to maintain the evaporator 14 at a substantially constant temperature or a slight increase as the outside air temperature Ta, the engine coolant temperature Tw and the condenser refrigerant pressure raises. On the other hand, the compressor OFF threshold temperature is preferably set to increase in value so that the compressor 16 turns OFF earlier as the outside air temperature Ta rises, the engine coolant temperature Tw rises or the condenser refrigerant pressure rises. Accordingly, the temperature range for cycling the compressor 16 between the ON and OFF operating states becomes smaller as the outside air temperature Ta rises, the engine coolant temperature Tw rises or the condenser refrigerant pressure rises. Basically, the first thermal protection phase is designed not to compromise the performance of the air conditioner as the ambient temperature Ta rises, but only to compromise the performance of the air conditioner when the other requirements demand it compromised.

When the engine coolant temperature or the condenser refrigerant pressure reaches a certain prescribed level value, the air conditioner 10 will start operating in the second thermal protection phase. In the second thermal protection phase, both the compressor ON threshold temperature and the compressor OFF threshold temperature are increased in value so that the compressor 16 turns OFF at a higher evaporator temperature Te, and the compressor 16 does not turn ON until a higher evaporator temperature Te is reached. Accordingly, in the second thermal protection phase, the temperature of the condenser is held at a substantially lower temperature than the temperature of the first thermal protection phase.

Figure 4:
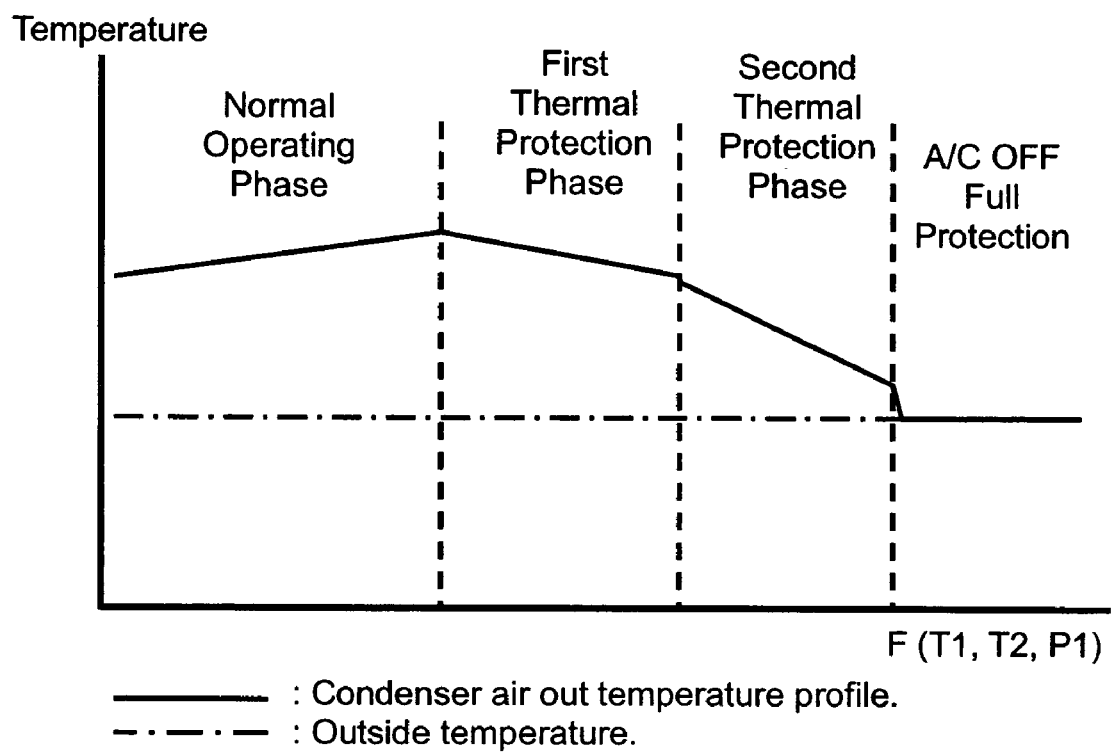
FIG. 4 is a chart showing the condenser air out temperature profile for the air exiting of the condenser when an air conditioner is controlled in accordance with the present invention.

Referring now to FIG. 4, the effect on the air exiting the condenser 18 when the air conditioner 10 is operated in accordance with the present invention will now be discussed. As seen in FIG. 4, during the normal operating phase, the condenser temperature Tc is adjusted based on a function of the outside air temperature Ta. Thus, when the outside air temperature Ta rises, the condenser temperature Tc also rises accordingly. However, when the air conditioner 10 is operating in either the first or second phases, the air exiting the condenser 18 drops in temperature since the cooling performance of the air conditioner 10 has been lowered.

Figure 5:
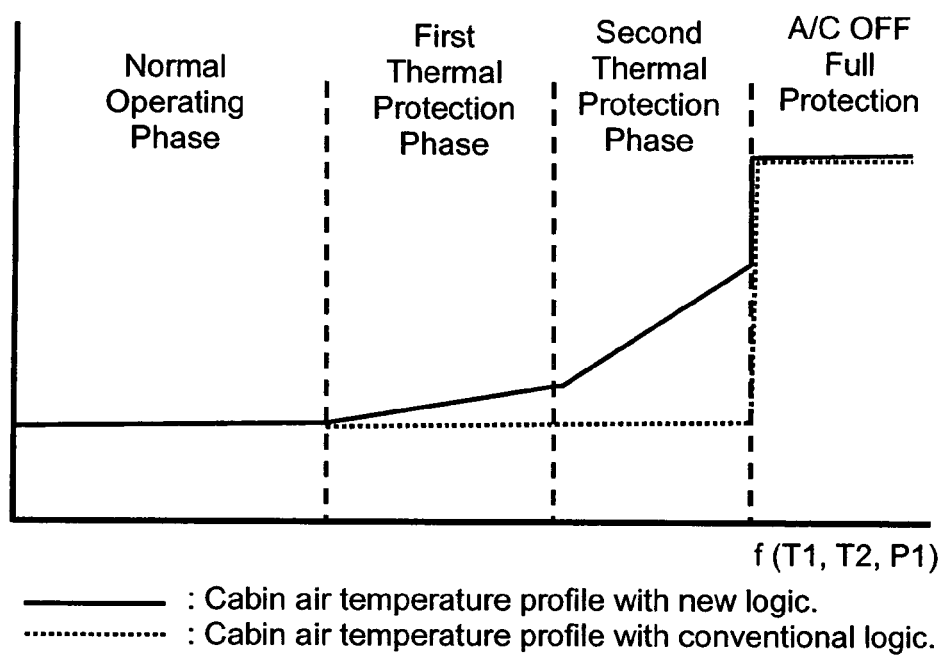
FIG. 5 is a chart showing the vehicle cabin air temperature profiles for an air conditioner that is controlled in accordance with the present invention (solid line) and for an air conditioner controlled in accordance with conventional control logic (broken line)

As seen in FIG. 5, during the normal operating phase, compressor 16 is operated such that the cabin temperature remains substantially constant. However, since the air conditioning cooling performance has been lowered the cabin temperature will rise during the first and second thermal protection phases as seen in FIG. 5. During the first thermal protection phase, the compressor OFF threshold temperature has been increased due to the engine coolant temperature Tw exceeding a first prescribed temperature value. During the second thermal protection phase, the cabin temperature rises as a faster rate than the first thermal protection phase, because both the compressor ON and OFF threshold temperatures have been increased due to the engine coolant temperature Tw exceeding a second prescribed temperature value. In the event that the engine 12 significantly overheats, the air conditioner 10 will be shut down completely to protect the engine such that the cabin temperature will rise to the ambient temperature of the outside air.

Referring now to FIGS. 6–11, the various control maps that are used utilized to set the compressor ON and OFF threshold temperatures will now be discussed. The compressor ON threshold temperature is a function of the outside air temperature Ta, the engine coolant temperature Tw and the condenser refrigerant pressure. Thus, six maps are provided for obtaining the values for the compressor ON and OFF threshold temperatures for each of the three phases.

Figure 6:
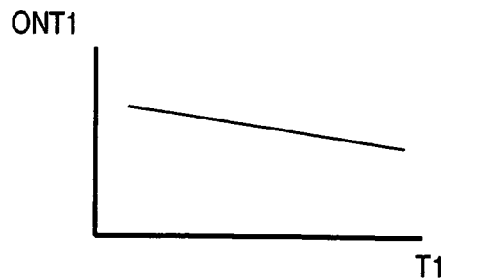
FIG. 6 is an outside air temperature threshold map that is configured to provide an outside air temperature threshold component corresponding to a current outside air temperature for determining a compressor ON threshold temperature.

FIG. 6 is an outside air temperature threshold map that is configured to provide an outside air temperature threshold component corresponding to a current outside air temperature Ta for determining a compressor ON threshold temperature. The outside air temperature Ta constitutes a first control temperature T1. Basically, the compressor ON threshold temperature component ONT1 gradually decreases as the first control temperature T1 (i.e., the outside air temperature Ta) increases. While the map indicates a linear relationship between the first control temperature T1 (i.e., the outside air temperature Ta) and the outside air temperature threshold component ONT1, it will be apparent to those skilled in the art from this disclosure that a nonlinear curve can be utilized based on various factors relating to the particular vehicle. In other words, the map of FIG. 6 is merely a simplified representation of a map that will be utilized for obtaining the outside air temperature threshold component ONT1 for a corresponding outside air temperature.

Figure 7:
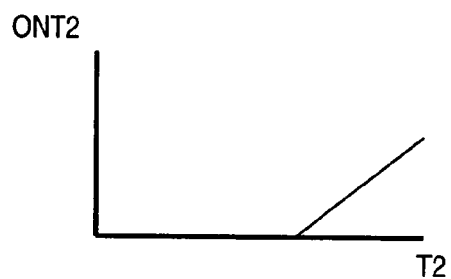
FIG. 7 is an engine coolant temperature threshold map that is configured to provide an engine coolant temperature threshold component corresponding to a current engine coolant temperature for determining a compressor ON threshold temperature.

Referring now to FIG. 7, an engine coolant temperature threshold map is illustrated for providing an engine coolant temperature threshold component ONT2 that corresponds to a current engine coolant temperature Tw for determining a compressor ON threshold temperature. The engine coolant temperature Tw constitutes a second control temperature T2. As seen in FIG. 7, when the engine coolant temperature Tw is relatively low, the engine coolant temperature threshold component ONT2 is preferably "0" such that the engine coolant temperature threshold component ONT2 does not influence the normal operating phase. However, once the engine coolant temperature Tw reaches a prescribed temperature, then the engine coolant temperature threshold component ONT2 increases with the increase in engine coolant temperature Tw (i.e., second control temperature T2). While the map of FIG. 7 indicates a linear relationship between the engine coolant temperature threshold component ONT2 and the second control temperature T2 (i.e., engine coolant temperature), it will be apparent to those skilled in the art from this disclosure that a nonlinear curve can be utilized based on various factors relating to the particular vehicle.

Figure 8:
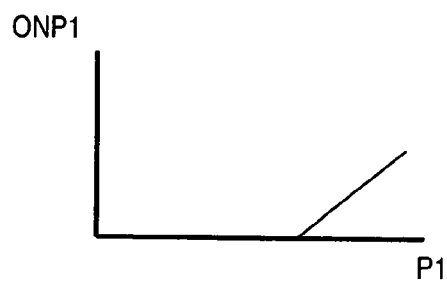
FIG. 8 is a condenser refrigerant pressure threshold map that is configured to provide a condenser refrigerant pressure threshold component corresponding to a current condenser refrigerant pressure for determining a compressor ON threshold temperature.

Referring now to FIG. 8, a condenser refrigerant pressure threshold map is illustrated that is configured to provide a condenser refrigerant pressure threshold component corresponding to a current condenser refrigerant pressure P1 for determining a compressor ON threshold temperature. Similar to the engine coolant temperature threshold map of FIG. 7, the condenser refrigerant pressure threshold map is preferably configured such that the condenser refrigerant pressure threshold component ONP1 is 0 until a prescribed pressure level has been reached in the condenser 18. Once the prescribed level has been exceeded, the condenser refrigerant pressure threshold component ONP1 increases with the increase in condenser refrigerant pressure P1. While the map of FIG. 8 indicates a linear relationship between the condenser refrigerant pressure threshold component ONP1 and the increase in condenser refrigerant pressure P1, it will be apparent to those skilled in the art from this disclosure that a nonlinear curve can be utilized based on various factors relating to the particular vehicle.

Figure 9:
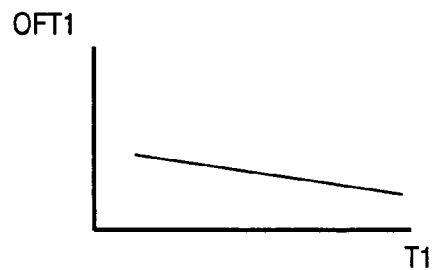
FIG. 9 is an outside air temperature threshold map that is configured to provide an outside air temperature threshold component corresponding to a current outside air temperature for determining the compressor OFF threshold temperature.

FIGS. 9 is an outside air temperature threshold map that is configured to provide an outside air temperature threshold component corresponding to a current outside air temperature Ta for determining a compressor OFF threshold temperature. Similar to the map of FIG. 6, the outside air temperature Ta constitutes a first control temperature T1. Basically, the compressor OFF threshold temperature component OFT1 gradually decreases as the first control temperature T1 (i.e., the outside air temperature Ta) increases. While the map indicates a linear relationship between the first control temperature T1 (i.e., the outside air temperature Ta) and the outside air temperature threshold component OFT1, it will be apparent to those skilled in the art from this disclosure that a nonlinear curve can be utilized based on various factors relating to the particular vehicle. In other words, the map of FIG. 9 is merely a simplified representation of a map that will be utilized for obtaining the outside air temperature threshold component OFT1 for a corresponding outside air temperature.

Figure 10:
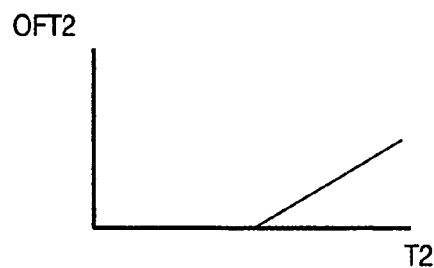
FIG. 10 is an engine coolant temperature threshold map that is configured to provide an engine coolant temperature threshold component corresponding to a current engine coolant temperature for determining a compressor OFF threshold temperature.

Referring now to FIG. 10, an engine coolant temperature threshold map is illustrated for providing an engine coolant temperature threshold component OFT2 that corresponds to a current engine coolant temperature Tw for determining a compressor OFF threshold temperature. The engine coolant temperature Tw constitutes a second control temperature T2 in the map of FIG. 10. As seen in FIG. 10, when the engine coolant temperature Tw is relatively low, the engine coolant temperature threshold component OFT2 is preferably "0" such that the engine coolant temperature threshold component OFT2 does not influence the normal operating phase. However, once the engine coolant temperature Tw reaches a prescribed temperature, then the engine coolant temperature threshold component OFT2 increases with the increase in engine coolant temperature Tw (i.e., second control temperature T2). While the map of FIG. 10 indicates a linear relationship between the engine coolant temperature threshold component OFT2 and the second control temperature T2 (i.e., engine coolant temperature), it will be apparent to those skilled in the art from this disclosure that a nonlinear curve can be utilized based on various factors relating to the particular vehicle.

Figure 11:
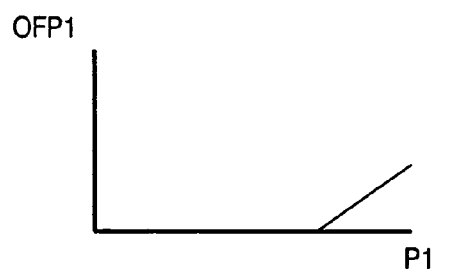
FIG. 11 is a condenser refrigerant pressure threshold map that is configured to provide a condenser refrigerant pressure threshold component corresponding to a current condenser refrigerant pressure for determining the compressor OFF threshold temperature.

Referring now to FIG. 11, a condenser refrigerant pressure threshold map is illustrated that is configured to provide a condenser refrigerant pressure threshold component corresponding to a current condenser refrigerant pressure P1 for determining a compressor OFF threshold temperature. Similar to the engine coolant temperature threshold map of FIG. 7, the condenser refrigerant pressure threshold map is preferably configured such that the condenser refrigerant pressure threshold component OFP1 is 0 until a prescribed pressure level has been reached in the condenser 18. Once the prescribed level has been exceeded, the condenser refrigerant pressure threshold component OFP1 increases with the increase in condenser refrigerant pressure P1. While the map of FIG. 11 indicates a linear relationship between the condenser refrigerant pressure threshold component OFP1 and the increase in condenser refrigerant pressure P1, it will be apparent to those skilled in the art from this disclosure that a nonlinear curve can be utilized based on various factors relating to the particular vehicle.

Figure 12:
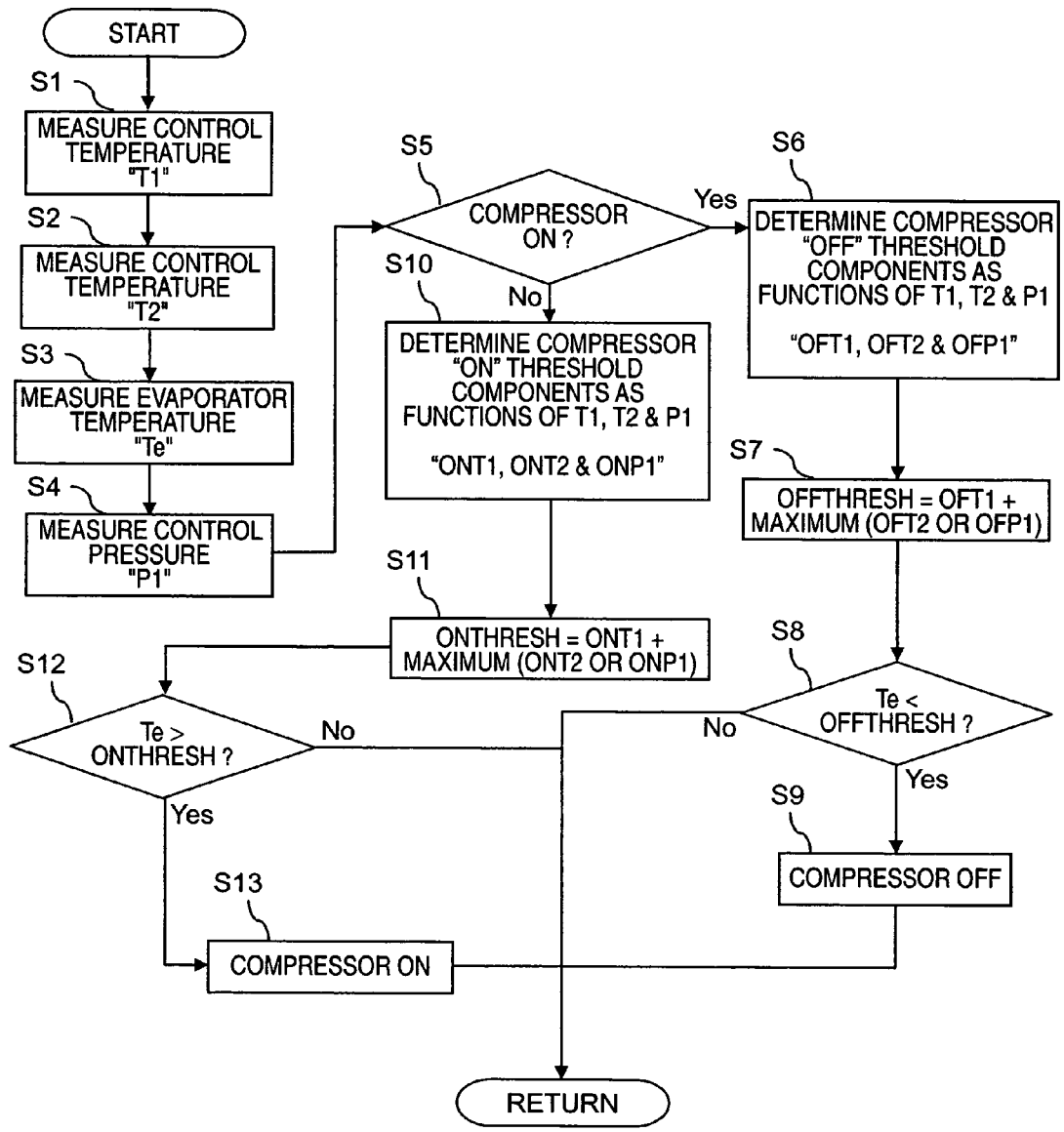
FIG. 12 is a flow chart showing a preferred control logic executed by the computer controller in accordance with the present invention.

Referring now to FIG. 12, a preferred control logic that is executed by the computer controller 24 will now be discussed. Once the operator controls 22 are set such that the air conditioner 10 is requested to cool the vehicle cabin, the control logic of FIG. 12 is executed. In particular, the control logic of FIG. 12 is configured to control the air conditioner as to operate in three different phases: the normal operating phase, the first thermal protection phase, and the second thermal protection phase. Of course, it will be apparent to those skilled in the art from this disclosure that additional thermal protection phases can be added or a single thermal protection phase can be utilized instead of two separate thermal protection phases.

In step S1, the computer controller 24 is configured to measure the outside air temperature Ta as the first control temperature T1 that enters the evaporator 14 and the condenser 18. In the illustrated embodiment in FIG. 1, the sensor 30 is provided in front of the condenser 18 for measuring the outside air temperature T1. Of course, the sensor 30 can be positioned in other locations as needed and/or desired. This signal from the sensor 30 is received by the computer controller 24 which utilizes the outside air temperature Tw (the first control temperature T1) as a basis for determining the outside air temperature threshold components ONT1 and OFT1 from the maps shown in FIGS. 6 and 9.

In step S2, the computer controller 24 measures the engine coolant temperature Tw as the second control temperature T2. In the illustrated embodiment of FIG. 1, the engine part/fluid temperature sensor 36 measures the engine part/fluid temperature which is assigned the control temperature T2. This signal is received by the computer controller 24 which utilizes the second control temperature T2 as a basis for determining the outside air temperature threshold components ONT2 and OFT2 from the maps shown in FIGS. 7 and 10.

In step S3, the computer controller 24 measures the evaporator temperature Te of the condenser 18. In the illustrated embodiment of FIG. 1, the sensor 34 produces a signal indicative of the surface temperature of the evaporator 14. This signal is received by the computer controller 24 which utilizes the evaporator temperature Te as a basis for turning ON or OFF the compressor 16 as discussed below. Then, the computer controller 24 proceeds to step S4.

In step S4, the computer controller 24 measures a control pressure P1 in the illustrated embodiment of FIG. 1, the control pressure P1 is measured by the sensor 32 which produces a signal indicative of the condenser refrigerant pressure in the condenser 18. This value of the condenser refrigerant pressure P1 is utilized in determining the compressor ON threshold component ONP1 from the map shown in FIG. 9 and the compressor OFF threshold component OFP1 from the map shown in FIG. 11. Next, the computer controller 24 proceeds to step S5.

In step S5, the computer controller 24 determines if the compressor 16 is currently in an ON operating state or in an OFF operating state. If the compressor 16 is in an ON operating state, then the processing proceeds to step S6. However, if the compressor 16 is in an OFF state, then the processing proceeds to step S10.

In step S6, the computer controller 24 is configured to determine a compressor OFF threshold components OFT1, OFT2 and OFP1 as a function of the control temperatures T1 and T2 and the control pressure P1, respectively. More specifically, the current values for T1, T2 and P1 are utilized in the maps of FIGS. 9–11 to determine the compressor OFF threshold components OFT1, OFT2 and OFP1. Then the computer controller 24 proceeds to step S7.

In step S7, the compressor OFF threshold temperature OFFTHRESH is calculated based on the compressor OFF threshold components OFT1, OFT2 and OFP1 that were obtained from the maps of FIGS. 9–11. In particular, the computer controller 24 calculates the compressor OFF threshold temperature value OFFTHRESH as the sum of the outside air temperature threshold component OFT1 and the maximum value of the engine coolant temperature threshold component OFT2 or the condenser refrigerant pressure threshold component OFP1. After calculating the compressor OFF threshold temperature OFFTHRESH, the computer controller 24 proceeds to step S8

In step S8, the computer controller 24 determines if the evaporator temperature of the evaporator 14 has fallen below the compressor OFF threshold temperature OFFTHRESH. If the evaporator temperature Te of the evaporator 14 has fallen below the compressor OFF threshold temperature OFFTHRESH, then the computer controller 24 proceeds to step S9, where the compressor 16 is turned OFF. However, if the evaporator temperature Te has not reached the compressor OFF threshold temperature OFFTHRESH, then the computer controller 24 returns to the start of the control loop.

Referring back to step S5, if the computer controller 24 has determined that the compressor 16 is in an OFF operating state, then the computer controller 24 proceeds to step S10.

In step S10, the computer controller 24 determines the compressor ON threshold components ONT1, ONT2 and ONP1 as a function of the controlled values T1, T2 and P1 which were previously obtained using the maps of FIGS. 6–8. After determining the compressor ON threshold components ONT1, ONT2 and ONP1, the computer controller 24 proceeds to step S11.

In step S11, the computer controller 24 determines the compressor ON threshold temperature=ONTHRESH. Preferably, the compressor ON threshold temperature ONTHRESH is the sum of the outside air temperature threshold component ONT1 and the maximum value of the engine coolant temperature threshold component ONT2 or the condenser refrigerant pressure threshold component ONP1. After calculating the compressor ON threshold temperature ONTHRESH, the computer controller 24 proceeds to step S12.

In step S12, the computer controller 24 compares the evaporator temperature Te of the evaporator 14 with the compressor ON threshold temperature ONTHRESH. If the evaporator temperature Te has exceeded the compressor on threshold temperature ONTHRESH, then the computer controller 24 has determined that the evaporation temperature Te has become too hot and the compressor 16 needs to be turned on. Thus, the computer controller 24 proceeds to step S13 where the compressor 16 is activated to the ON operating state such that the evaporator temperature Te is lowered.

Figure 13:
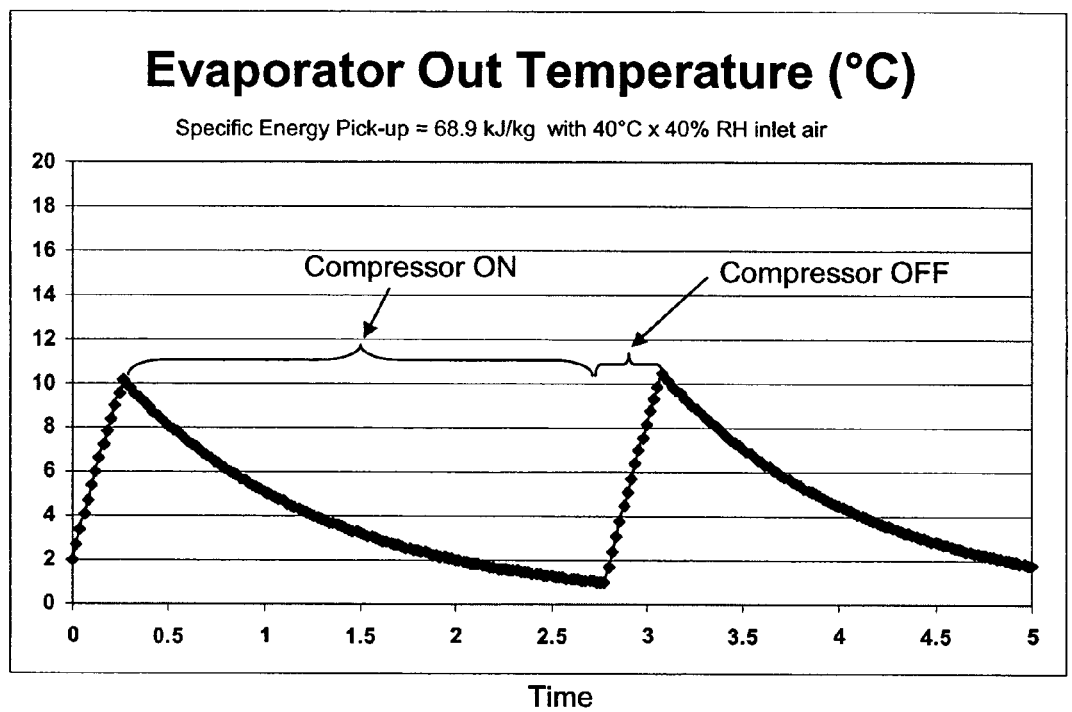
FIG. 13 is a graph showing the changes in the air temperature exiting the evaporator when the compressor is operated under normal operating phase.
Figure 14:
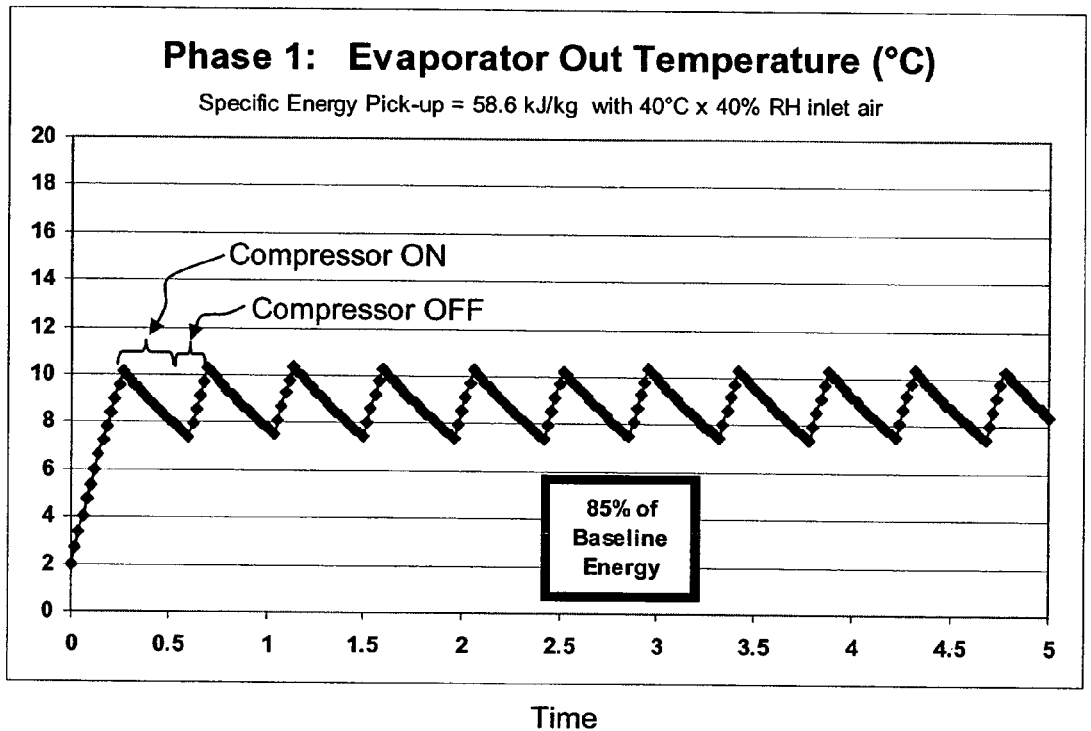
FIG. 14 is a graph illustrating the changes in the air temperature exiting the evaporator when the air conditioner is operated under a first thermal protection phase that reduces the condenser temperature while still providing air conditioning to the vehicle cabin.
Figure 15:
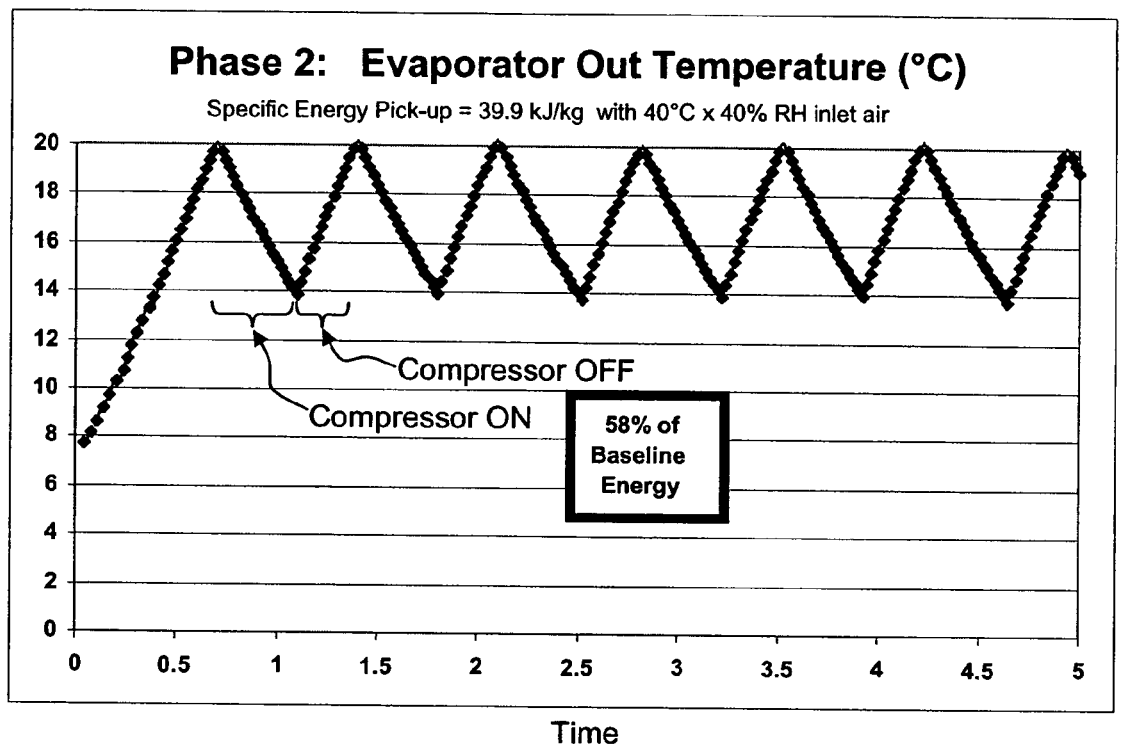
FIG. 15 is a graph illustrating the changes in the air temperature exiting the evaporator when the air conditioner is operated in accordance with a second thermal protection phase in accordance with the present invention.

Referring now to FIGS. 13–15, the graphs are shown that illustrate the effect of the air exiting evaporator 14 when the air conditioner 10 is being operated in each of the three phases in accordance with the present invention. In particular, FIG. 13 illustrates the cycling of the compressor 16 between the ON and OFF operating states wherein the upper and lower thresholds are not modified due to the thermal requirements of the engine 12 or the thermal requirements of any other component influenced by the temperature of the air passing through the condenser 18. As seen in FIG. 13, the evaporator temperature Te is gradually reduced over time when the compressor 16 is ON and then the evaporator temperature Te rises more quickly when the compressor 16 is turned OFF. The evaporator temperature Te rises quickly in high ambient or high thermal load conditions. The cooling, on the other hand, is more rapid and the increase of the evaporator temperature Te is slow in low ambient conditions. Accordingly, the cabin temperature can be maintained at a very comfortable level since the evaporator temperature Te is maintained within the prescribed temperature range.

As seen in FIG. 14, during the first thermal protection phase, the compressor ON threshold is maintained at the same temperature as the normal operating phase. However, the compressor OFF threshold has been raised as compared to the normal operating phase. Thus, the temperature range of the evaporator temperature Te is smaller in the first thermal protection phase as compared to the normal operating phase. As a result, the compressor 16 is cycled at a faster rate. Accordingly, the cabin temperature is only slightly compromised as compared to the normal operating phase.

As seen in FIG. 15, during the second thermal protection phase, the compressor ON and OFF thresholds both raised as compared to the normal operating phase and the first thermal protection phase. Thus, the cabin temperature is noticeably higher than in the normal operating phase or the first thermal protection phase. During the second thermal protection phase, the temperature range of the evaporator temperature Te is larger than the first thermal protection phase and smaller than the normal operating phase. Also, the compressor 16 is cycled at a faster rate than the normal operating phase but at a slower rate than the first thermal protection phase. As a result, during the second thermal protection phase, the average temperature difference between the evaporator outlet temperature To and the evaporator temperature Te is less. Accordingly, the average condenser temperature Tc will be significantly lower.

As used herein to describe the invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An air conditioner comprising:
    a condenser configured to receive a refrigerant in a compressed state and remove heat from at least a portion of the refrigerant;
    an evaporator in fluid communication with the condenser to receive the refrigerant, and configured to evaporate at least a portion of the refrigerant;
    a compressor in fluid communication with the evaporator, and configured to compress the refrigerant and deliver the refrigerant in the compressed state to the condenser; and
    a controller operatively coupled to the compressor to operate the compressor to change an average condenser temperature of the condenser from a first temperature to a second temperature that is lower than the first temperature based on at least one control signal indicative of thermal requirements of a vehicle component influenced by the average condenser temperature of the condenser.

2. The air conditioner according to claim 1, wherein the at least one control signal includes an engine part/fluid temperature signal indicative of a current engine part/fluid temperature.

3. The air conditioner according to claim 1, wherein the at least one control signal includes a condenser pressure signal indicative of a current condenser pressure.

4. The air conditioner according to claim 1, wherein the at least one control signal includes an outside air temperature signal indicative of an outside air temperature.

5. The air conditioner according to claim 1, wherein the at least one control signal includes an engine part/fluid temperature signal indicative of a current engine part/fluid temperature and a condenser pressure signal indicative of a current condenser pressure with the controller being configured to selectively use one of the engine temperature signal and the condenser pressure signal.

6. The air conditioner according to claim 1, wherein the controller is further configured to set an upper evaporator temperature threshold for the evaporator and a lower evaporator temperature for the evaporator to substantially maintain the average condenser temperature at the second temperature.

7. The air conditioner according to claim 6, wherein the controller is further configured to set the upper evaporator temperature threshold for the evaporator and a lower evaporator temperature for the evaporator to substantially maintain the average condenser temperature at the first temperature.

8. The air conditioner according to claim 7, wherein the controller is further configured to set the upper evaporator temperature threshold for the second temperature at approximately the upper evaporator temperature threshold for the first temperature, and set the lower evaporator temperature for the second temperature at a higher temperature value than the lower evaporator temperature threshold for the first temperature.

9. The air conditioner according to claim 7, wherein the controller is further configured to set the upper evaporator temperature threshold for the second temperature at higher temperature value than the upper evaporator temperature threshold for the first temperature, and set the lower evaporator temperature for the second temperature at a higher temperature value than the lower evaporator temperature threshold for the first temperature.

10. The air conditioner according to claim 7, wherein the controller is further configured to operate the compressor to change the average condenser temperature of the condenser from the second temperature to a third temperature that is lower than the second temperature based on the at least one control signal indicating a worsening condition of the vehicle component influenced by the average condenser temperature of the condenser.

11. The air conditioner according to claim 10, wherein the controller is further configured to set the upper evaporator temperature threshold for the second temperature at approximately the upper evaporator temperature threshold for the first temperature, set the lower evaporator temperature for the second temperature at a higher temperature value than the lower evaporator temperature threshold for the first temperature, and set an upper evaporator temperature threshold for the third temperature at higher temperature value than the upper evaporator temperature threshold for the second temperature, and set the lower evaporator temperature for the third temperature at a higher temperature value than the lower evaporator temperature threshold for the second temperature.

12. The air conditioner according to claim 1, wherein the controller is further configured to cycle the compressor between on and off states at a faster rate and maintaining an evaporator temperature of the evaporator between a narrower temperature range when substantially maintaining the second temperature as compared to the controller cycles the compressor between the on and off states when substantially maintaining the first temperature.

13. The air conditioner according to claim 12, wherein the controller is further configured to operate the compressor to change the average condenser temperature of the condenser from the second temperature to a third temperature that is lower than the second temperature based on the at least one control signal indicating a worsening condition of the vehicle component influenced by the average condenser temperature of the condenser.

14. The air conditioner according to claim 13, wherein the controller is further configured to cycle the compressor between on and off states at a faster rate and maintaining an evaporator temperature of the evaporator between a narrower temperature range when substantially maintaining the third temperature as compared to the controller cycles the compressor between the on and off states when substantially maintaining the first temperature.

15. The air conditioner according to claim 14, wherein the controller is further configured to cycle the compressor between the on and off states at a slower rate and maintaining an evaporator temperature of the evaporator between a wider temperature range when substantially maintaining the third temperature as compared to the controller cycles the compressor between the on and off states when substantially maintaining the second temperature.

16. The air conditioner according to claim 1, wherein the controller is further configured to change the displacement of the compressor to change an average condenser temperature of the condenser from a first temperature to a second temperature.

17. An air conditioner comprising:
heat removal means for removing heat from at least a portion of a refrigerant in a compressed state;
evaporation means for evaporating at least a portion of the refrigerant;
compressing means for compressing the refrigerant and delivering the refrigerant in the compressed state to the heat removal means; and
control means for selectively operating the compressing means to change an average temperature of the heat removal means from a first temperature to a second temperature that is lower than the first temperature based on at least one control signal indicative of thermal requirements of a vehicle component influenced by the average temperature of the heat removal means.

18. A method of operating an air conditioner comprising:
operating a compressor to substantially maintain an average temperature of a condenser at a first temperature when a vehicle component influenced by the average temperature of the condenser is operating within a predetermined operating condition;
determining when the vehicle component can be favorably influenced by lowering the average temperature of the condenser; and
subsequently operating the compressor to substantially maintain the average temperature of a condenser at a second temperature that is lower than the first temperature upon a determination that the vehicle component can be favorably influenced by lowering the average temperature of the condenser.

19. The method according to claim 18, further comprising subsequently operating the compressor to change the average temperature of the condenser from the second temperature to a third temperature that is lower than the second temperature based on a determination indicating a worsening condition of the vehicle component influenced by the average condenser temperature of the condenser.

20. The method according to claim 18, further comprising setting a first upper evaporator temperature threshold for an evaporator and a first lower evaporator temperature for the evaporator to substantially maintain the average condenser temperature at the first temperature, and setting a second upper evaporator temperature threshold for an evaporator and a second lower evaporator temperature for the evaporator to substantially maintain the average condenser temperature at the second temperature.

21. The method according to claim 20, wherein the second upper evaporator temperature threshold for the second temperature is set at approximately the first upper evaporator temperature threshold for the first temperature; and the second lower evaporator temperature for the second temperature is set at a higher temperature value than the first lower evaporator temperature threshold for the first temperature.

22. The method according to claim 20, further comprising maintaining an evaporator temperature of an evaporator between a narrower temperature range when substantially maintaining the second temperature as compared to when substantially maintaining the first temperature.

23. The method according to claim 18, wherein
the operating of the compressor to substantially maintain the average temperature of the condenser at the first temperature is performed by cycling of the compressor between the on and off states; and
the operating of the compressor to substantially maintain the average temperature of the condenser at the second temperature is performed by cycling of the compressor between the on and off states.

24. The method according to claim 23, wherein
the cycling of the compressor between the on and off states occurs at a faster rate when substantially maintaining the second temperature as compared to when substantially maintaining the first temperature.

25. The method according to claim 24, wherein
the cycling of the compressor between the on and off states occurs at a faster rate and maintains an evaporator temperature of the evaporator between a narrower temperature range when substantially maintaining the third temperature as compared the cycling of the compressor between the on and off states when substantially maintaining the first temperature.

26. The method according to claim 25, wherein
the cycling of the compressor between the on and off states occurs at a slower rate and maintaining an evaporator temperature of the evaporator between a wider temperature range when substantially maintaining the third temperature as compared to the controller cycles the compressor between the on and off states when substantially maintaining the second temperature.

27. The method according to claim 23, further comprising
cycling the compressor between the on and off states to change the average temperature of the condenser from the second temperature to a third temperature that is lower than the second temperature based on a determination indicating a worsening condition of the vehicle component influenced by the average condenser temperature of the condenser.

28. The method according to claim 18, wherein
the operating of the compressor to substantially maintain the average temperature of the condenser at the first temperature is performed by changing displacement of the compressor to a first pressure; and
the operating of the compressor to substantially maintain the average temperature of the condenser at the second temperature is performed by changing displacement of the compressor to a second pressure.

* * * * *